April 22, 1969     M. D. ZOTTOLO     3,439,573

DRUM TUNING DEVICE

Filed Sept. 5, 1967

INVENTOR.
MARCO D. ZOTTOLO 3,439,573
DRUM TUNING DEVICE
Marco D. Zottolo, La Mesa, Calif.
(3008 55th St., San Diego, Calif. 92105)
Filed Sept. 5, 1967, Ser. No. 665,335
Int. Cl. G10d 13/02
U.S. Cl. 84—411                                    1 Claim

ABSTRACT OF THE DISCLOSURE

A drum head tuning mechanism wherein a control knob having a gear attached thereto rotates a ring gear in a fixed plane; gear teeth on the external rim of the ring gear coact with vertical teeth on the inside of a retaining hoop to adjust the tension of the drum head.

Summary of the invention

My drum has a hollow vertical cylindrical shell having at least one open end. A flat ring has an inner diameter slightly larger than the diameter of the shell and is adapted to slide over the open end. A diaphragm is secured to the ring and seals the opening therein whereby the diaphragm stretches across and seals the open end. A hollow member is provided with two vertical cylindrical sections open at both ends. These sections are spaced one below the other and have a common vertical axis. One section has an inner diameter larger than that of the shell and smaller than the outer diameter of the ring. The other section has an inner diameter larger than the outer diameter of the ring. These sections are joined by a circular horizontal shoulder which rests upon the ring. Manually operative means can vary the pressure of the shoulder upon the ring, thus varying the pressure exerted on the diaphragm and varying the tension thereof.

Detailed description of preferred embodiment

Figure 1:
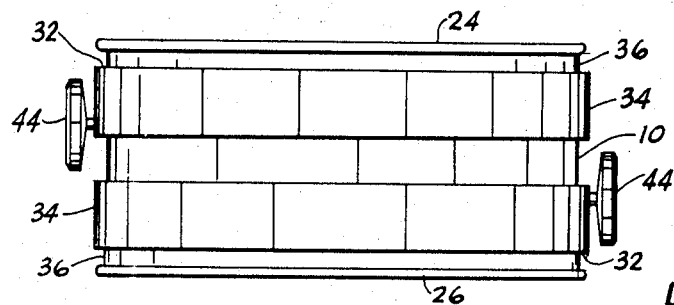
FIG. 1 is a side view of my drums.
Figure 2:
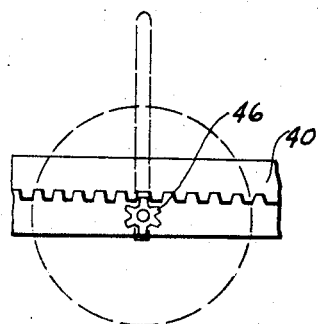
FIG. 2 is a detail view of a portion of the tension control mechanism.
Figure 3:
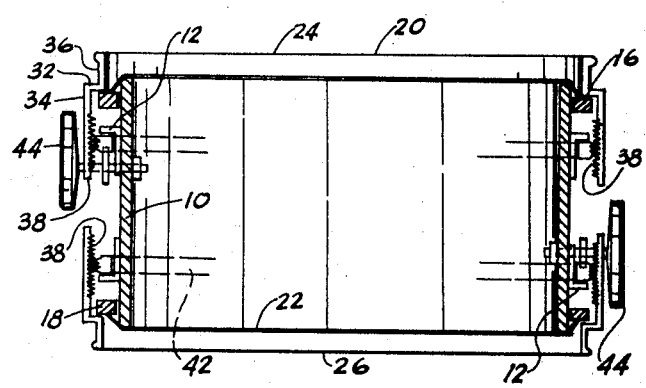
FIG. 3 is a cross sectional view of my drum.
Figure 4:
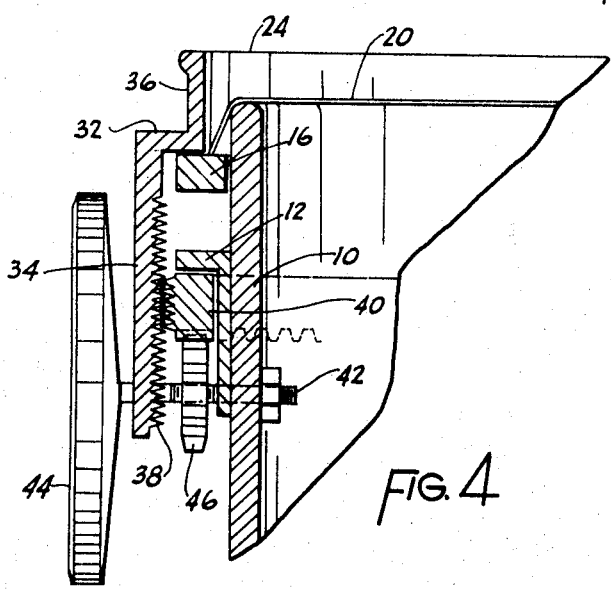
FIG. 4 is an enlarged detail cross sectional view of a portion of the drum.

A vertical hollow cylindrical shell 10 has upper and lower open ends. First and second horizontal circular outwardly projecting lips 12 and 14 are secured to the outer surface of the shell adjacent the upper and lower ends respectively.

First and second flat horizontal rings 16 and 18 each having an inner diameter somewhat larger than that of of the shell, slide over the upper and lower ends respectively. First and second diaphragms 20 and 22 are secured respectively to corresponding rings and seal the central opening therein as well as sealing the corresponding open end of the shell. The tension in each diaphragm can be controlled by moving the ring up or down, axially along the shell, while the diaphragm seals the appropriate end of the shell.

First and second hollow members 24 and 26 each have two vertically spaced vertical hollow cylindrical sections 34 and 36 having a common axis and connected by a horizontal circular shoulder 32. One section 34 has an an inner diameter larger than the outer diameter of the corresponding ring and slides thereover. The other section 36 has an inner diameter smaller than the outer diameter of the ring and larger than that of the shell whereby shoulder 32 bears upon the corresponding ring.

Each section 34 has first and second oppositely disposed vertical racks 38. Two horizontal ring gears 40 are each disposed within a corresponding one of lips 12 and 14 and have peripheral teeth engaging the corresponding racks.

First and second rotatable horizontal shafts 42 connect to the shell adjacent the corresponding gears 40 and the racks. Each shaft can be rotated by a corresponding control knob 44. Each shaft adjacent the control knob has a gear 46 in engagement with the ring gear 40.

As a result, the tension on each diaphragm can be separately controlled by rotation of the corresponding knob which rotates its shaft which rotates its gear 46 which rotates the ring gear 40 which in turn engages the racks and moves the corresponding members 24 and 26 in the axial direction of the shell to vary the pressure on the corresponding ring.

As compared to conventional drums, my invention has the following advantages:

(1) The pitch of the drum can be changed instantly with one tuning knob instead of the eight separately adjustable tension rods for each end of the drum;

(2) Uniform tension on the drum heads is maintained at all times even when tigthening and loosening the drum head, thus providing enhanced tonal quality (because of the tension rods, uniform tension in conventional drums cannot be so maintained);

(3) The number of parts is reduced by a factor of four; and (4) Old or broken drum heads and/or diaphragms can be easily removed and replaced rapidly, whereas each of the tension rods has to be separately removed and replaced in conventional drums, with consequent increased complexity of the operation with much more time being required.

Having thus described my invention, I claim as new and desire to secure by Letters Patent:

1. A drum comprising:
   a hollow vertical cylindrical shell having at least one open end;
   a ring slidably carried by said shell;
   a diaphragm secured to said ring and sealing an opening therein whereby said diaphragm seals said at least one open end;
   a hollow member having two vertical cylindrical sections open at both ends and spaced one below the other along a common axis, one cylindrical section having an inner diameter larger than that of the shell and smaller than the outer diameter of the ring, the other section having an inner diameter larger than the outer diameter of the ring, said sections being joined by a circular horizontal shoulder which rests upon said ring;
   the other section having a rack on an inner surface thereof;
   a rotatable gear coupled to the rack; and
   a control knob coupled to said rotatable gear for rotating the rotatable gear.

References Cited

UNITED STATES PATENTS

| 1,204,182 | 11/1916 | O'Conner | 84—411 |
| 2,172,578 | 9/1939 | Gladstone | 84—411 |
| 2,425,996 | 8/1947 | Cordes | 84—411 |

RICHARD B. WILKINSON, *Primary Examiner.*

L. R. FRANKLIN, *Assistant Examiner.*